(No Model.)
C. D. SALFIELD.
MILK BOILER.
No. 370,974. Patented Oct. 4, 1887.
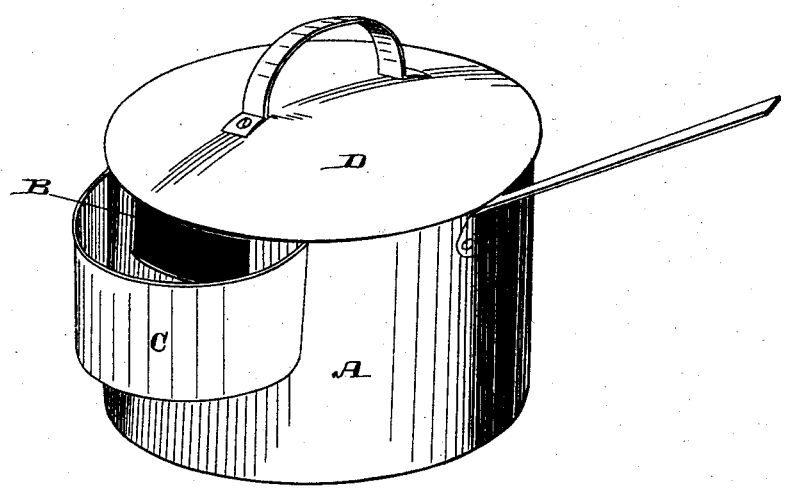
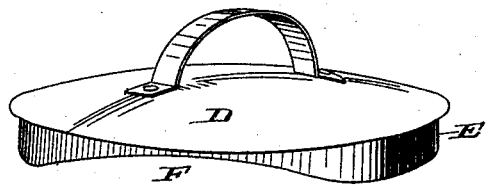
Witnesses,
Geo. H. Strong.
J. T. Tower.
Inventor,
C. D. Salfield
By Dewey & Co.
att

UNITED STATES PATENT OFFICE.

CARL D. SALFIELD, OF SAN FRANCISCO, CALIFORNIA.

MILK-BOILER.

SPECIFICATION forming part of Letters Patent No. 370,974, dated October 4, 1887.

Application filed April 16, 1887. Serial No. 235,054. (No model.)

*To all whom it may concern:*

Be it known that I, CARL D. SALFIELD, of the city and county of San Francisco, State of California, have invented an Improvement in Milk-Boilers; and I hereby declare the following to be a full, clear, and exact description of the same.

My invention relates to a device for boiling milk and similar substances, and which is designed to prevent the boiling over of the liquid.

It consists of a supplemental chamber secured to one side of the vessel, which has an opening made near the top, leading into this chamber, the flanged cover being also reduced, so as to leave free access to the supplemental chamber.

Referring to the accompanying drawings for a more complete explanation of my invention, Figure 1 is a view of my device. Fig. 2 is a view of the lid.

In boiling milk and similar liquids great difficulty is experienced on account of the milk suddenly boiling over and burning on the stove. In order to prevent this, I make the vessel A with an opening, B, in one side, close to the top, this opening being of considerable size, as shown. Upon the side of the vessel A is fitted a semi-cylindrical chamber, C, which incloses the opening B, having its edges and bottom soldered tightly to the side of the vessel A.

The bottom of the chamber C is at a considerable height from the bottom of the chamber A, so that it will not be affected by the heat of the stove and the solder melted to make it leak. The cover D of the vessel has the usual flange, E, projecting downwardly, so as to enter inside the rim of the vessel A, and this flange is cut away at F, the part which corresponds with the opening B in the side of the chamber, until it is of such shallow depth that it will not obstruct the opening.

When milk is boiled in the vessel A, it becomes thicker on account of the cream rising to the top, and often suddenly rises, so as to boil over; but with my device the cream will escape into the supplemental chamber C through the opening B, and the surplus will thus be received and prevented from boiling over upon the stove.

By placing a screen over the top of the chamber C the device may be used to cook peas and other articles, the water being easily poured off afterward without danger of burning the hands.

Having thus described my invention, what I claim as new, and desire to secure by Letters Patent, is—

A milk-boiler consisting of the vessel A, having an opening made in one side near the top, the short semi-cylindrical chamber secured to the side of the vessel A, inclosing the opening, and having its bottom at some distance above the bottom of the vessel A, in combination with the cover, having the flange cut away to correspond with the opening, substantially as herein described.

In witness whereof I have hereunto set my hand.

CARL D. SALFIELD.

Witnesses:
S. H. NOURSE,
H. C. LEE.